United States Patent [19]

Certeza

[11] Patent Number: 5,492,209
[45] Date of Patent: Feb. 20, 1996

[54] SHIFT CONTROL MECHANISM FOR A MULTI-SPEED COUNTERSHAFT TRANSMISSION

[75] Inventor: Cesar F. Certeza, Sterling Heights, Mich.

[73] Assignee: Saturn Corporation, Troy, Mich.

[21] Appl. No.: 280,234

[22] Filed: Jul. 25, 1994

Related U.S. Application Data

[63] Continuation-in-part of Ser. No. 197,037, Feb. 16, 1994, Pat. No. 5,385,223.

[51] Int. Cl.[6] ................................................. B60K 41/26
[52] U.S. Cl. ........................ 192/4 C; 74/475; 74/476
[58] Field of Search ............................ 192/4 C, 53 G, 192/4 A; 74/339, 475, 476

[56] References Cited

U.S. PATENT DOCUMENTS

| | | | |
|---|---|---|---|
| 4,510,819 | 4/1985 | Inui | 74/477 |
| 4,531,418 | 7/1985 | Takahasi et al. | 74/339 |
| 4,584,895 | 4/1986 | Holmes | 74/476 |
| 4,601,214 | 7/1986 | Fukuchi | 74/477 |
| 4,605,109 | 8/1986 | Fukuchi et al. | 192/4 C |

*Primary Examiner*—Andrea L. Pitts
*Attorney, Agent, or Firm*—Donald F. Scherer

[57] ABSTRACT

A neutral-reverse shift control actuator is provided in a countershaft transmission. The actuator is operatively connected through a resilient detent mechanism to a forward shift control mechanism. During a neutral-reverse shift maneuver, the drive connection partially manipulates the forward synchronizer, such that synchronization between the input and output shaft is achieved during a reverse shift maneuver. During a five-six or six-five shift, a detent structure is available to reduce the 3-4 neutral force of the centering spring in the shift control mechanism.

2 Claims, 5 Drawing Sheets

5,492,209

SHIFT CONTROL MECHANISM FOR A MULTI-SPEED COUNTERSHAFT TRANSMISSION

This is a continuation-in-part application of U.S. Ser. No. 08/197,037, filed Feb. 16, 1994, now U.S. Pat. No. 5,385,223, issued Jan. 31, 1995.

TECHNICAL FIELD

This invention relates to shift controls for power transmissions, and more particularly, to neutral-reverse controls for countershaft transmissions.

BACKGROUND OF THE INVENTION

Countershaft type transmissions have incorporated therein a neutral-reverse brake mechanism which generally utilizes a cone member positioned on a stationary housing. The cone member is engaged by a synchronizer cone clutch which is operated by the synchronizer sleeve during a reverse shift maneuver. The engagement between cone surfaces will synchronize the two shafts associated therewith, generally the input shaft and output shaft. The rotating input shaft will be brought to a halt, such that the reverse idler gear can be brought into meshing engagement with a pair of reverse ratio gears.

One such system is described in U.S. Pat. No. 4,598,599 issued to Ikemoto, Jul. 8, 1986. This and similar systems require that an additional cone clutch, blocker ring and stationary cone be provided in the transmission to accomplish the braking or synchronizing action required during a neutral to reverse shift. These components add to the cost, complexity and overall length of the transmission.

SUMMARY OF THE INVENTION

A neutral-reverse brake actuator which uses one of the forward synchronizer mechanisms is provided by the present invention. The reverse shift mechanism includes a reverse fork or lever which is operable upon manipulation by a reverse control fork to move the reverse idler gear into operative engagement with the reverse ratio gears disposed on the input and output shaft of the transmission.

The reverse lever or fork includes a mechanism which will pivotally operate the fork and is detented to a shift control rod for one of the forward ratios. Preferably, the five-six shift mechanism is utilized to provide the synchronization desired.

During a portion of the reverse shift maneuver, the five-six control rod is also moved through a resilient detent connection between the reverse mechanism and the rod. A stop surface is provided on the shift control gate which will prevent full actuation of the forward ratio but will permit initial engagement of the synchronizer cone clutch structures of generally the sixth forward ratio mechanism. This will cause synchronization between the input shaft and the output shaft, and, since the output shaft is stationary during a neutral to reverse shift, the input shaft will be brought to a halt. When the synchronization is completed, the reverse idler gear can be brought into mesh silently with the reverse ratio gears. A five-six neutral detent, which is the subject of U.S. patent application Ser. No. 08/280,235, filed Jul. 25, 1994, is also described herein.

It is therefore an object of this invention to provide an improved neutral-reverse shift control mechanism for a countershaft type transmission having a single-rail shift control rod by utilizing an operative connection between the reverse control mechanism and a forward synchronizer mechanism.

It is another object of this invention to provide an improved neutral-reverse shift control mechanism having an operative connection between a reverse shift control mechanism and a forward shift control mechanism for synchronizing the transmission input and output shafts during a neutral-reverse shift maneuver.

It is a further object of this invention to provide an improved neutral-reverse shift control mechanism wherein a forward ratio shift control rod is resiliently connected with a reverse shift control mechanism to enforce partial engagement with a forward synchronizer during a portion of the neutral-reverse shift maneuver to enforce synchronization between the input and output shafts.

These and other objects and advantages of the present invention will be more apparent from the following specification and drawings.

DESCRIPTION OF AN EXEMPLARY EMBODIMENT

Figure 2:
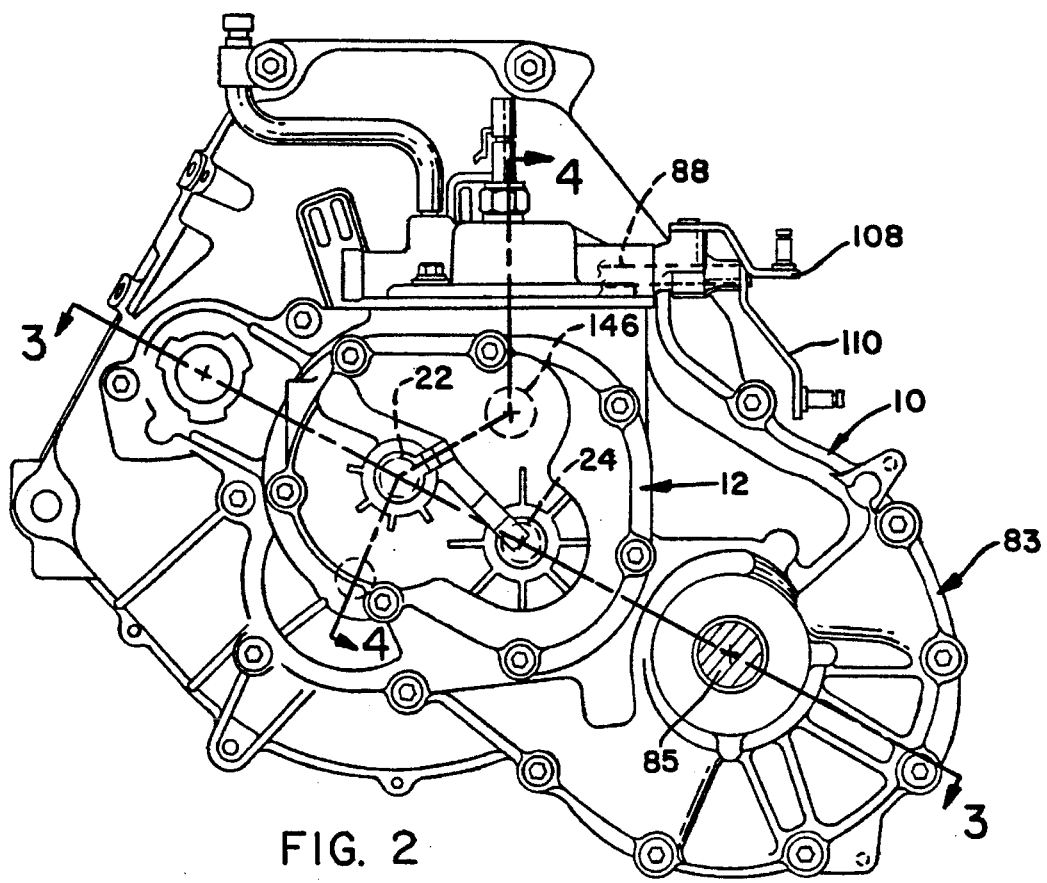
FIG. 2 is an end view of a transmission incorporating the present invention.
Figure 3:
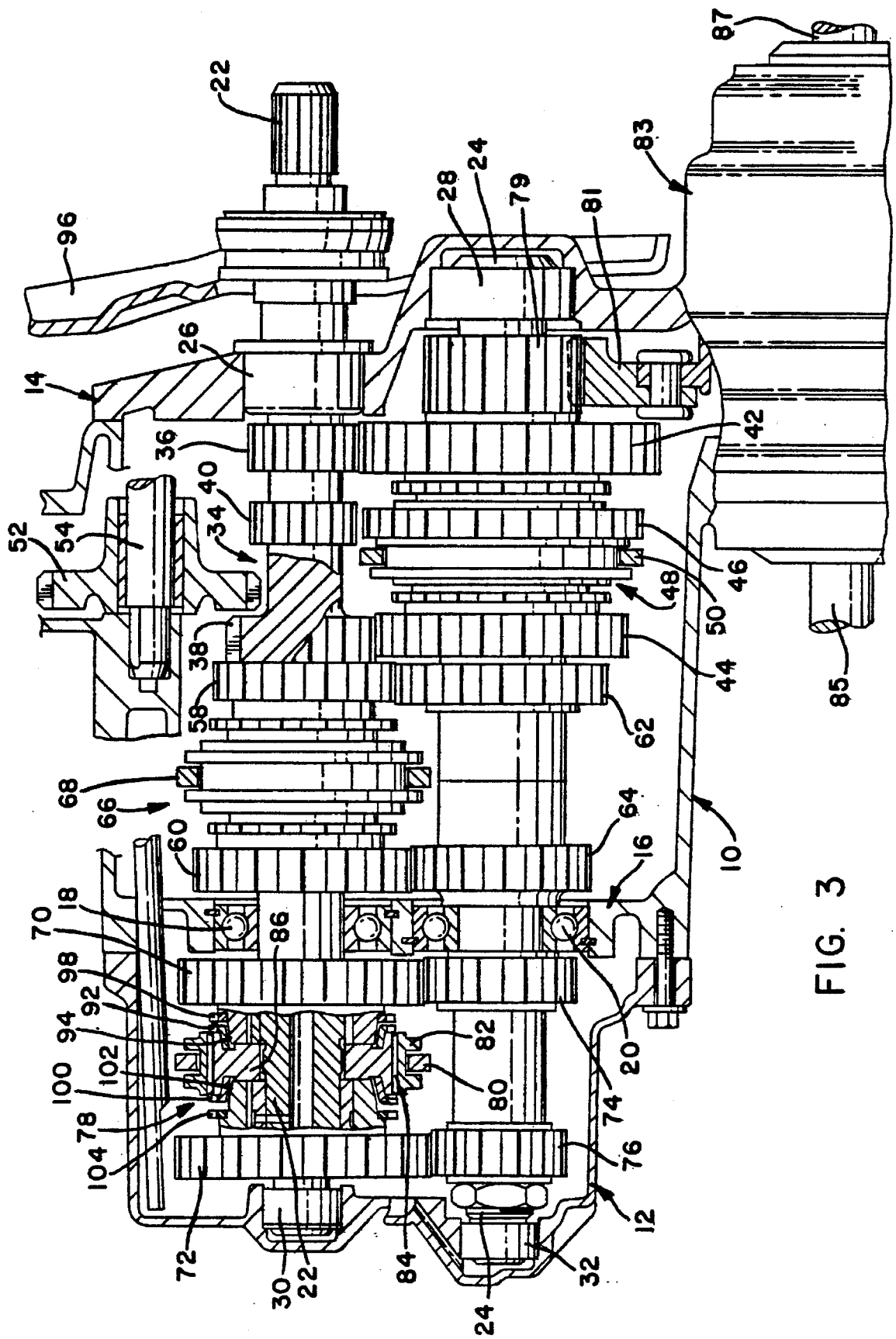
FIG. 3 is a view taken along line 3—3 of FIG. 2.
Figure 4:
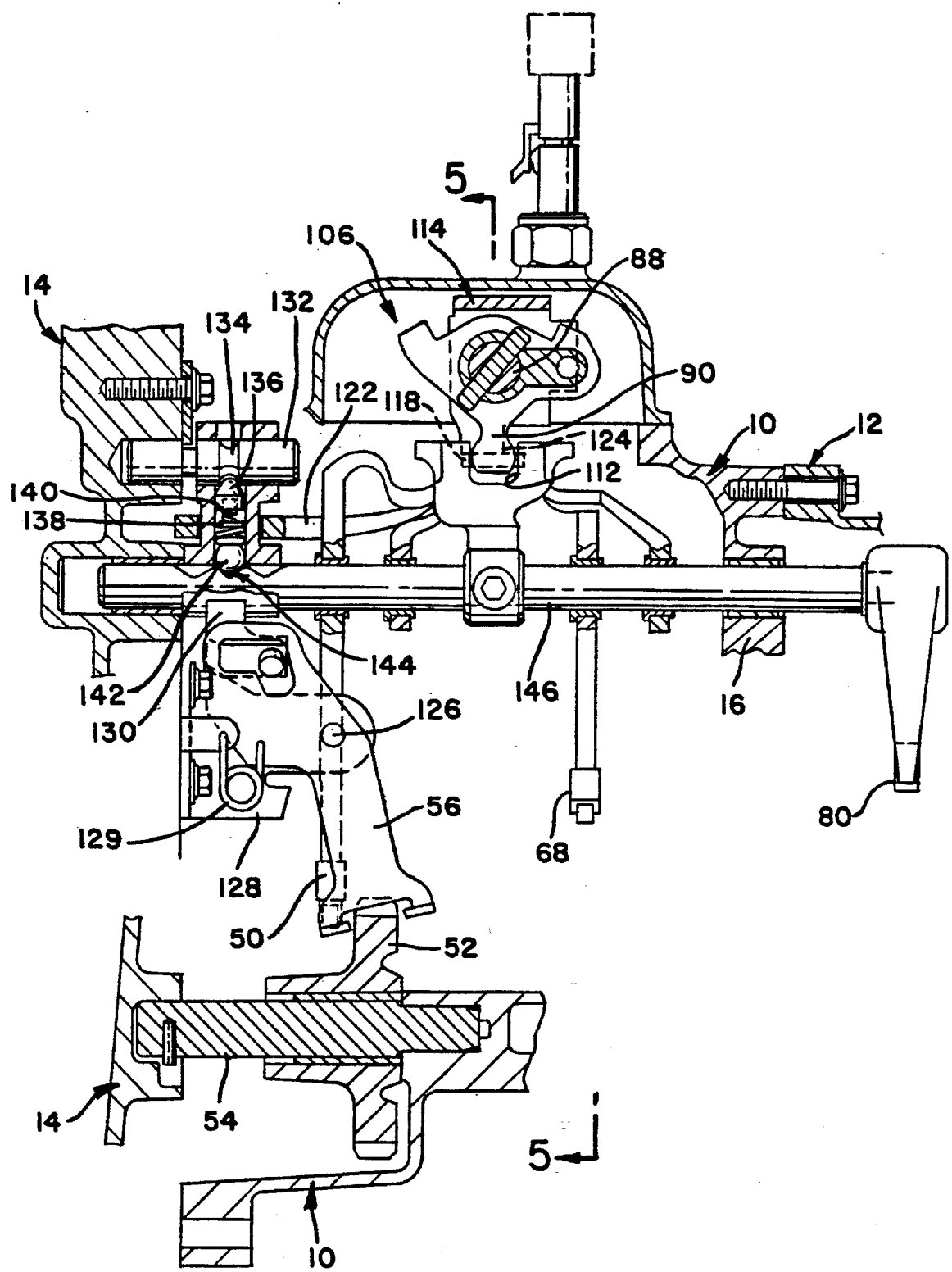
FIG. 4 is a view taken along line 4—4 of FIG. 2.

The transmission, as best seen in FIGS. 2, 3 and 4, has a transmission housing 10 closed on one end by a rear cover 12 and on the other end by a front cover 14. The housing 10 has a support wall 16 in which a pair of bearings 18 and 20 rotatably support an input shaft 22 and an output shaft 24, respectively. The input shaft 22 is also rotatably supported in a bearing 26 disposed in the front cover 14 while the transmission output shaft is rotatably supported in a bearing 28 disposed in the front cover 14. The rear cover 12 has disposed therein seal mechanisms 30 and 32 which cooperate with the input shaft 22 and output shaft 24, respectively, to distribute lubricating fluid to the various components within the transmission.

The input shaft 22 has secured thereto a cluster gear arrangement 34 which is comprised of a first ratio gear 36, a second ratio gear 38 and a reverse ratio gear 40. The first ratio gear 36 meshes with a first ratio gear 42 disposed rotatably on the output shaft 24 and the second ratio gear 38 meshes with a second ratio gear 44 rotatably disposed on the output shaft 24. The reverse gear 40 is aligned with a reverse gear 46 which is rotatably connected with the output shaft 24 through a conventional 1-2 synchronizer mechanism 48. The synchronizer mechanism 48 is operated by a 1-2 fork 50 to selectively connect the gear 42 or the gear 44 with the output shaft 24 to provide first and second ratios, respectively.

The reverse gears 40 and 46 are axially aligned and are disposed for engagement by a selectively moveable reverse idler gear 52. The reverse idler gear 52 is moved axially on a reverse idler shaft 54 by a reverse shift control fork 56, shown in FIG. 4, to selectively provide a reverse ratio.

The input shaft 22 has rotatably supported thereon a third ratio gear 58 and a fourth ratio gear 60 which mesh with gears 62 and 64, respectively. The gears 62 and 64 are rotatably fast with the output shaft 24. A conventional 3-4 synchronizer assembly 66 is operable through manipulation of a 3-4 shift fork 68 to selectively connect the third gear 58 or the fourth gear 60 with the input shaft 22 when either the third or fourth drive ratio is requested or desired by the operator.

Also rotatably supported on the input shaft 22, is a fifth gear 70 and a sixth gear 72. These gears respectively mesh with gears 74 and 76 which are rotatably fast with the output shaft 24. A 5-6 synchronizer assembly 78 is operable through manipulation of a 5-6 shift fork 80 to establish the connection of the gear 70 or the gear 72 with the input shaft 22. An output gear 79 is rotatable with the output shaft 24 and meshes with a conventional differential input gear 81 of a conventional differential 83. The differential 83 has two output or drive shafts 85, 87 which are connected in a conventional manner to drive vehicle wheels, not shown.

The operation of the synchronizers 48, 66 and 78 are well known, since these are conventional devices. The synchronizer 78 has a sleeve or collar 82 which is slidably disposed on a spline 84 which is drivingly connected to a hub 86. The hub 86 is drivingly connected with the input shaft 22. Thus, the sleeve 82 will rotate in unison with the input shaft 22. The sleeve 82 can be manipulated to the right or left, as viewed in FIG. 3, by a shift actuator rod 88 and shift paddle 90, which are shown in FIG. 4. The paddle 90 will manipulate the 5-6 shift fork 80 which, in turn, will move the sleeve 82 either right or left depending upon the gear which is desired by the operator.

During a rightward movement, as viewed in FIG. 3, the sleeve 82 will actuate a cone clutch 92 into engagement with a cone surface 94 formed on the gear 70. The cone surfaces, upon meshing, will force rotation of the gear 70 to match the rotational speed of the gear 74, assuming the input shaft 22 has been disconnected from the engine by a conventional clutch which is operated through a clutch lever 96. The manipulation of such devices is well known. Once the cone clutch 92 and cone surface 94 have been forced to synchronization between the input shaft 22 and the output shaft 24, the sleeve 82 is free to mesh with a set of teeth 98 formed on the gear 70 to complete the shift maneuver in a well known manner.

If the sleeve 82 is manipulated leftward, a cone clutch 100 is forced into engagement with a cone surface 102 to provide synchronization of the gear 72 with the output shaft 24. Following synchronization, the shift to sixth ratio is completed by the shift collar 82 engaging or meshing with the gear 104 secured to the gear 72.

The 1-2 synchronizer 48 and 3-4 synchronizer 66 operate in a similar manner to that described for the 5-6 synchronizer 78. These structures are well known as is their operation, and it is not believed that a more detailed description is required at this point.

Figure 1:
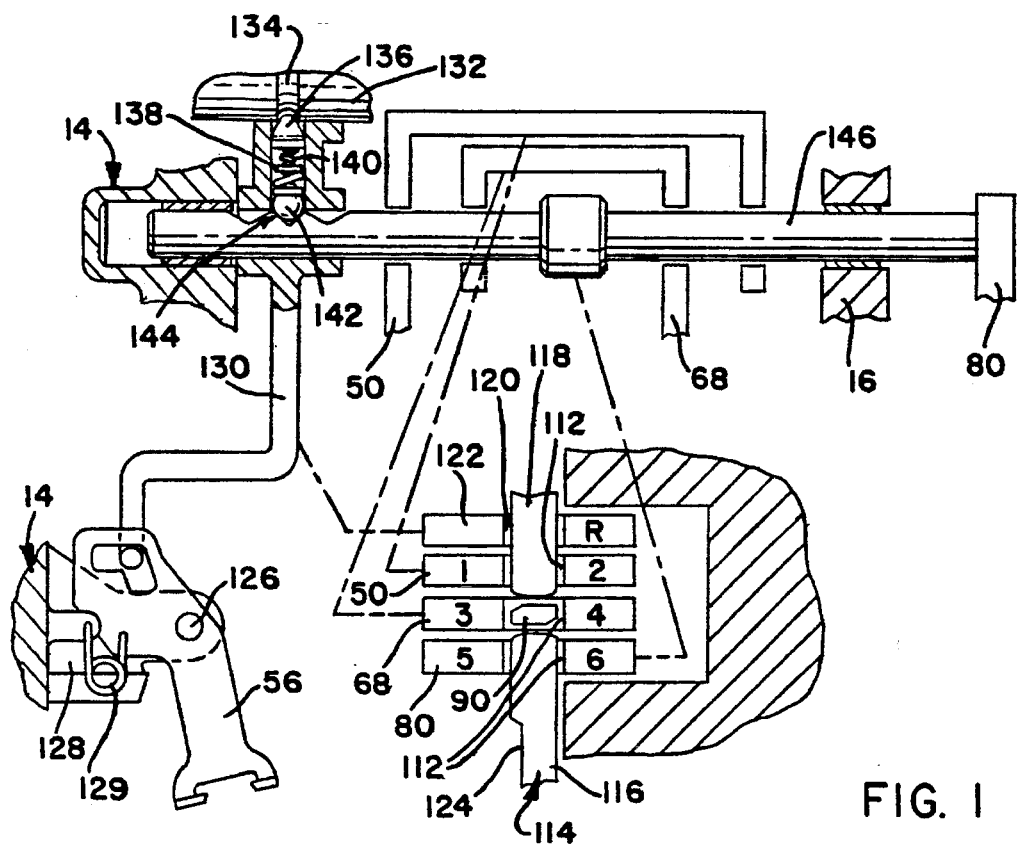
FIG. 1 is a diagrammatic representation of a shift control mechanism utilized with a countershaft type transmission.
Figure 5:
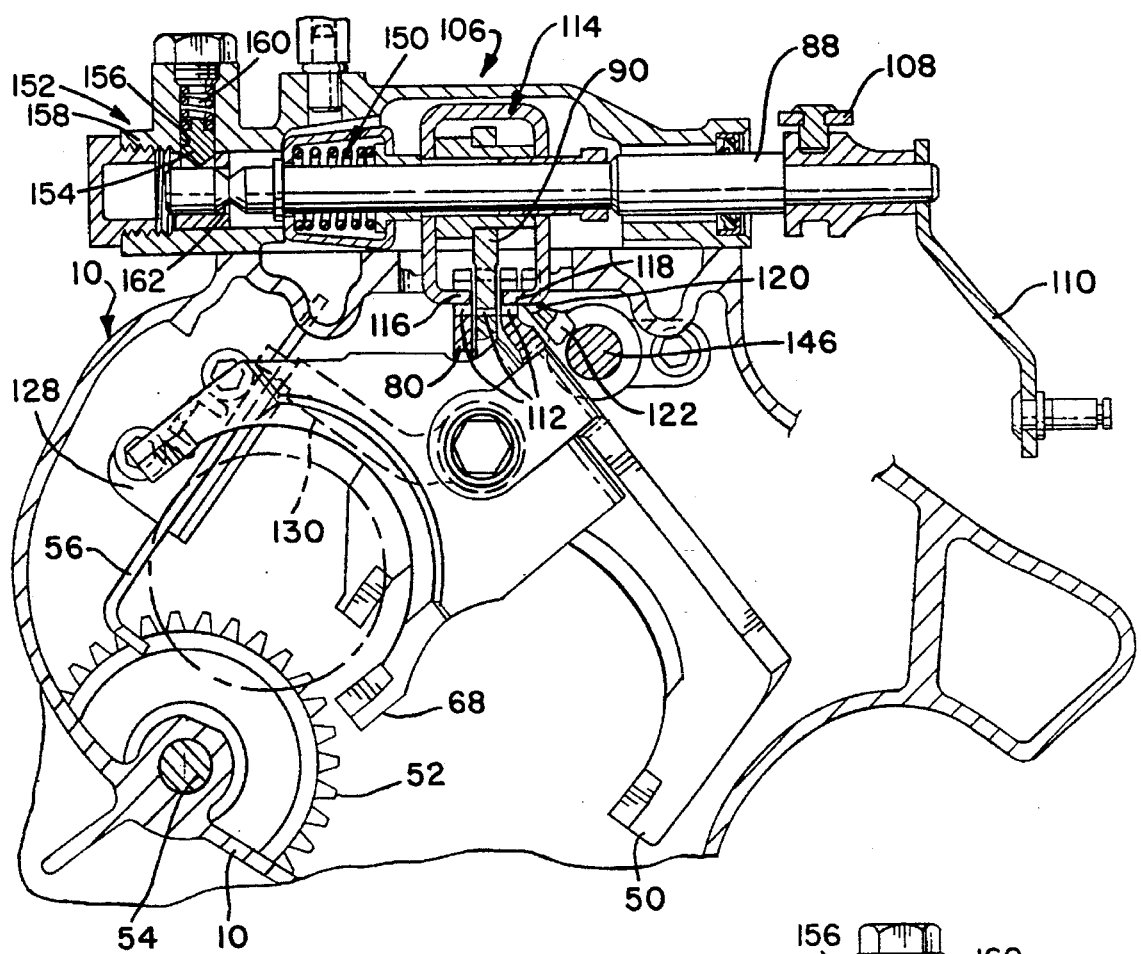
FIG. 5 is a view taken along line 5—5 of FIG. 4 with some components eliminated for clarity.

The shift paddle 90 and actuator rod 88 are components of a conventional shift actuator assembly 106. Such assemblies are well known and do take various structural differences, however, their manipulation and operation are quite similar. Two such assemblies are shown in U.S. Pat. No. 5,036,721 issued to Gugin, Aug. 6, 1991, and U.S. Pat. No. 5,101,680 issued to Parsons, Apr. 7, 1972. The shift actuators 106 generally incorporate the paddle 90 and actuator rod 88. The actuator rod 88 is moved longitudinally by a lever 108, as seen in FIGS. 1 and 5, and rotatably by a lever 110. The lever 108 will cause the rod 88 to move axially, such that the paddle 90 can be aligned in slots 112 formed in the 1-2 shift fork 50, the 3-4 shift fork 68 and the 5-6 shift fork 80.

When the paddle 90 has been aligned in one of these slots, the lever 110 is actuated to enforce leftward or rightward movement of the shift forks, as best seen in FIG. 4. It is the axial or longitudinal movement of the shift forks which enforces movement of the synchronizer clutch sleeves, such as sleeve 82, to further enforce the engagement of the respective gear ratios.

The shift paddle 90 is manipulated within a control gate 114 by the shift actuator rod 88. The control gate 114 has a pair of blocking arms 116, 118 which are effective to engage the slots 112, not engaged by the shift paddle 90, thereby preventing axial movement of more than one shift fork at a given time. The blocking arm 118 is effective to engage the slots 112 on both the 1-2 shift fork 50 and 3-4 shift fork 68 when the paddle 90 is engaged in the slot 112 of the 5-6 shift fork 80. Likewise, the blocking arm 116 is engaged within the slots 112 of the 5-6 shift fork 80 and the 3-4 shift fork 68 when the paddle 90 is engaged in the slot 112 of the 1-2 shift fork 50.

As seen in FIG. 5, the arm 118 is engaged in the 1-2 shift fork 50 and the arm 116 is engaged in the 5-6 shift fork 80. The arm 118, as seen in FIG. 1, is also engaged in a slot 120 formed in a reverse control fork 122. This will prevent manipulation of the reverse control fork when the 3-4 shift fork is being manipulated.

Figure 6:
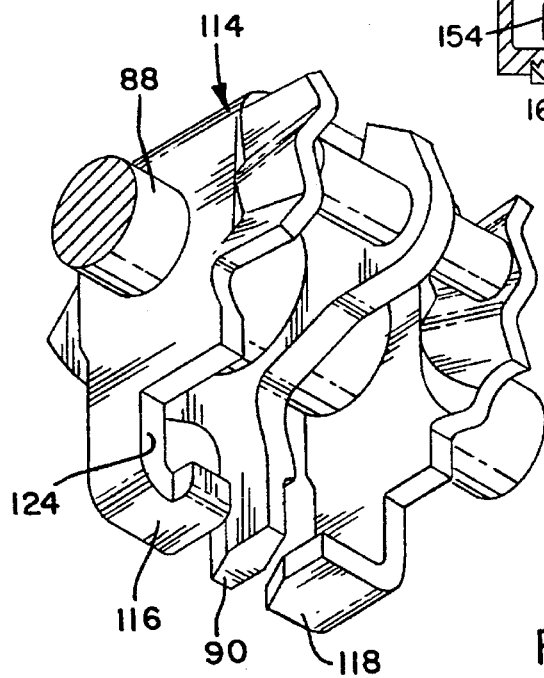
FIG. 6 is a perspective view of a portion of the shift control assembly.

When a reverse drive is to be selected, the paddle 90 is moved fully rightward to engage the slot 120 and the stop arm 116 will engage in the slots 112 to prevent manipulation of the other shift forks. The stop arm 116, as best seen in FIG. 6, has a notch portion 124. The notch portion 124 will align in the slot 112 of the 5-6 shift fork 80 when the paddle 90 is aligned in the slot 120 of the reverse shift fork 122. The notch 124 will permit limited axial movement of the synchronizer sleeve 82 when the paddle 90 is engaged in the slot 120 of the reverse shift fork 122. To engage the reverse ratio, the paddle 90 will be manipulated counterclockwise, as seen in FIG. 4, which will result in rightward movement of the reverse control fork 122. As will be explained hereinafter, this will also result in a rightward movement of the 5-6 shift fork 80. This rightward movement is limited by the depth of the notch 124. The notch 124 is sized to permit the sleeve 82 to move rightward, as viewed in FIG. 3, a sufficient amount to engage the cone clutch 100 with the surface 102, but not sufficient to permit the sleeve 82 to engage the teeth 98. Thus, the synchronizer cone clutch can be engaged, but the synchronizer gear teeth cannot be engaged.

As previously described, the cone clutch 100 will enforce synchronization between the input and output shafts since during a reverse maneuver, the output shaft is zero, this will bring the input shaft to a halt and thereby permitting silent engagement of the reverse idler 52 with the reverse gears 40 and 46. As best seen in FIG. 4, the reverse shift control fork 56 is pivotally mounted on a pin 126 which is mounted in a bracket 128 secured to the front cover 14. An overcenter spring 129 assists in positioning the fork 56 in either the reverse position or the idler position shown.

The reverse control fork 122 is operatively connected with a reverse control member 130 which is slidably disposed on a post 132 secured in front cover 14. The post 132 has a detent groove 134 in which is operatively connected a detent plug or bullet 136. The bullet is spring-loaded to the detented position by an inner spring 140.

The spring 140 is longer than an outer spring 138 in their respective free states, such that spring 140 will always provide a separating force on the ball 142 and plug 136. The spring rate of spring 138 is higher than the spring rate of spring 142. Thus, the force output of spring 138 increases more rapidly than the force output of spring 142 when the springs are simultaneously compressed.

The spring 138 is designed to be short of filling the space between the ball 142 and plug 136 by a predetermined distance 139. This distance 139 is approximately equal to or slightly less than the depth of notch 134. This distance 139 is greater than the distance required for the ball 142 to be raised out of the detent 144A. Thus, the spring 138 imposes a force between the plug 136 and ball 142 only when the plug 136 is dislodged from the notch 134. This occurs only during a shift to reverse.

Since the spring 138 does not have sufficient length to fill the gap between the ball 142 and plug 146 in the neutral state shown in FIG. 4, the spring 138 does not impose a detent load in neutral.

The outer spring 138 will ensure a heavy detent load during maneuver of the reverse control member 130. The other end of the springs 138 and 140 are abutting a ball 142 which is disposed in a detent structure 144 formed on a 5-6 control rod 146. The movement of the rod 146 will occur with lighter detent loads since the ball 142 has considerably less movement during the movement of the shift control rod 146 than during the simultaneous displacement of the detent bullet 136 and ball 142 when activating reverse control member 130.

During the neutral to reverse shift, the plug 136 is dislodged from the detent groove 134. The linear movement of plug 136 causes contact with and compression of the spring 138 thereby increasing the detent load on the shaft 146 as the springs 138 and 142 are compressed simultaneously. The reverse fork 122 will cause axial movement of the reverse control member 130 which will result in pivoting of the reverse fork 56 and thereby movement of the reverse idler gear 52. The rightward movement of the member 130 will also result, because of the detent loads, in rightward movement of the 5-6 rod 146 and 5-6 shift fork 80.

Figure 4B:
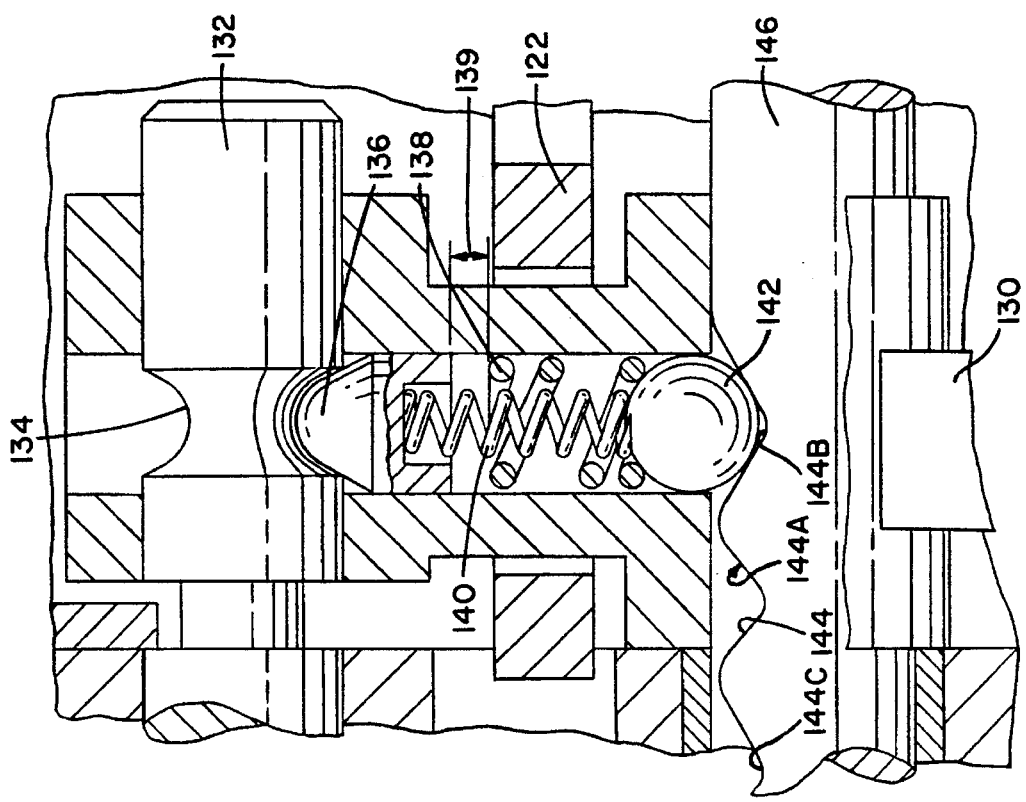
FIGS. 4A and 4B are enlarged views of a portion of FIG. 4 depicting the detent structure in two operating positions.
Figure 4A:
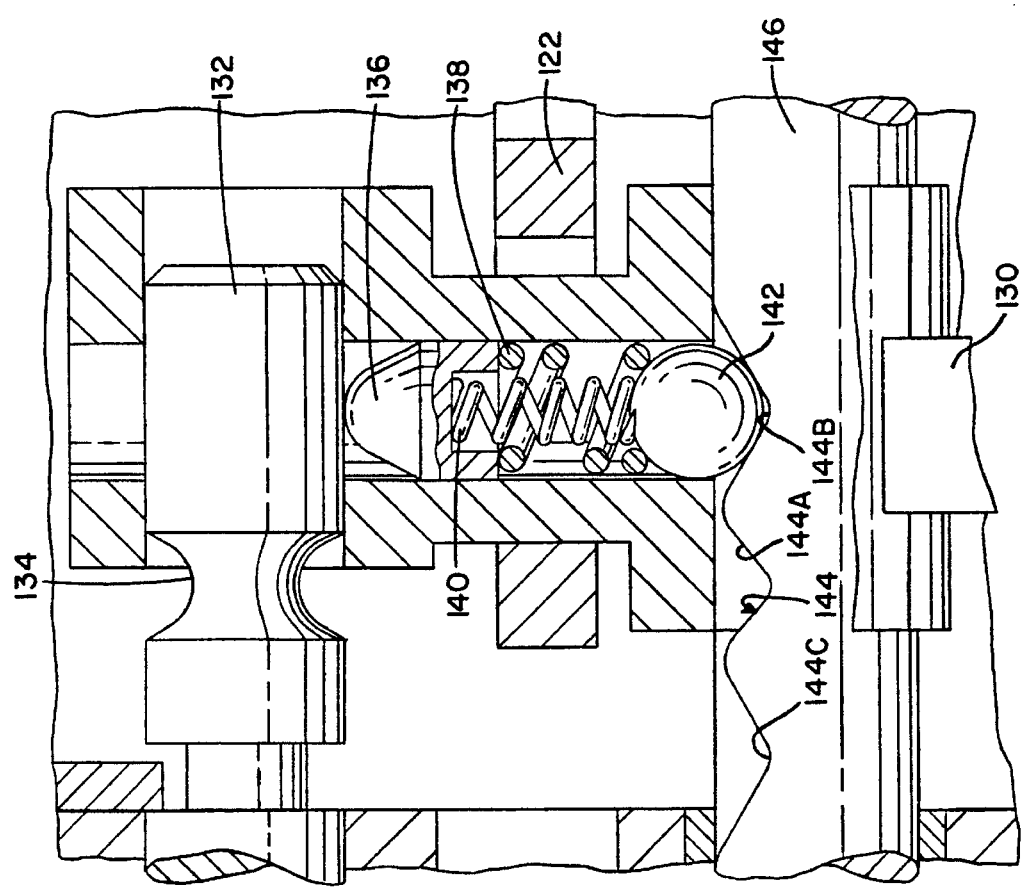

After the arm 116 is abutted by shift fork 80, the ball 142 will be in the position 144B in detent structure 144 shown in FIG. 4A and the rod 146 will be returned to the 5-6 neutral position. Note, the detent 144A is aligned with notch 134 when the reverse position is achieved, as seen in FIG. 4A. On a shift from neutral to reverse, the ball 142 and detent structure 144 will provide detent feel as the shift linkage is moved to the position shown in FIG. 4. The shift fork 80 is prevented from moving by the arm 116 during a reverse to neutral shift, however, the ball 142 will be positioned in the detent structure 144A.

As previously described, this neutral-reverse shift will result in movement of the clutch sleeve 82 of the synchronizer 78. The movement will be limited by the notch 124 on the arm 116. The movement will be limited to engagement of the cone clutch 100 and cone surface 102 without full synchronization of the sixth ratio gears. Thus, the system will be synchronized for a reverse shift by bringing the input shaft to a speed equal to the output shaft, which is generally zero during a neutral to reverse shift.

The detent mechanism comprised of the ball 142 will permit the reverse shift to be completed. At the completion of the reverse shift, the synchronizer 78 will return to its neutral condition.

The components shown diametrically in FIG. 1, have been given the same numerical designation as their corresponding components in FIGS. 2 through 6. It is believed that the presentation of FIG. 1, provides a more understandable representation of the invention. As is seen, the arm 116 has formed therein the notch 124.

When the paddle 90 is moved to the slot 120 of the reverse control fork 122, the notch 124 will be aligned with the 5-6 shift fork 80. It can be seen that the 5-6 shift fork and the control rod 146 associated therewith, can have rightward movement caused by the detent bullet 136 and the associated springs 138 and 140, while the reverse fork 56 is being pivoted about the pin 126 to establish the reverse drive position of the idler gear 52.

It should be apparent to those skilled in the art at this point, that the 5-6 synchronizer 78 is utilized to control the spin down time of the input shaft during the neutral to reverse shift. This, of course, reduces the number of components which are required in the transmission to provide for this reverse brake. The 5-6 synchronizer is required within the transmission to permit the operator to select the fifth or sixth ratio under synchronized conditions.

The 5-6 detent mechanism comprised of spring 140, ball 142 and detent structure 144 is also operable to provide detent feel during a five-six shift or a six-five shift or a neutral to fifth or a neutral to sixth shift. From the neutral position, shown in FIG. 4, the fork 80 is engaged by the paddle 90 for manipulation to the fifth gear position or to the sixth gear position. As the rod 146 is moved to the sixth gear position shown in FIG. 4B, the ball 142 is forced linearly out of the notch 144A of the detent 144. During this shift, the plug 136 remains engaged in the notch 134. This movement will compress spring 140 but not spring 138. Thus, the detent load is lighter for a neutral to six or neutral to five shift than for a neutral to reverse shift.

When the neutral to six shift is complete, the 5-6 detent mechanism will assume the position shown in FIG. 4B. During a neutral to five shift, the ball 142 will be positioned in the notch 144C. Also during this shift sequence, the plug 136 will remain in the notch 134, such that only the lighter detent load is imposed.

The shift actuator assembly 106 also includes a neutral centering spring 150 which urges the rod 88 to the 3-4 neutral position shown in FIG. 5. During a 5-6 or a 6-5 shift, the spring 150 imposes a 3-4 neutral force on the rod 88. This would require an operator input force to maintain the rod 88 in the 5-6 neutral slot in the shift fork 80. To alleviate this force, a 5-6 detent structure 152 is provided. The detent structure 152 is comprised of a bullet or plug 154 slidably disposed in a bore 156 formed in a housing 158 of the shift actuator 106, a spring 160 and a notch 162. The spring 160 urges the bullet 154 into abutment with the rod 88.

Figure 5A:
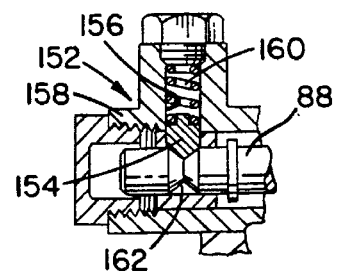
FIG. 5A is an enlarged view of a portion of FIG. 5 depicting the detent structure in another operation position.

In the 3-4 neutral position shown in FIG. 5, the bullet abuts the outer diametral surface of rod 88. However in the 5-6 position, the bullet 154 engages the notch 162, as seen in FIG. 5A, and significantly reduces the centering effect of spring 150. Thus, during a 5-6 or 6-5 shift sequence, the operator does not need to overcome the full force of spring 150 as the paddle 90 passes through the 5-6 neutral position.

When the operator desires to complete a downshift from fifth or from sixth beyond fifth, only slight pressure on the manual shift lever, not shown, will overcome the 5-6 detent. This will inhibit unintentional downshifts during a 6-5 or 5-6 shift sequence.

The reverse control member 130, fork 122 and reverse fork 56 are also required, regardless of whether this synchronizing process is used. Thus, substantially, the only additional elements are the detent components of the bullet 136 and the spring 138.

Obviously, the present invention incorporates into a six speed countershaft transmission a neutral-reverse brake without the introduction of expensive or extraordinary components. It also eliminates the need for additional axial space required for a dedicated cone type reverse brake.

The embodiments of the invention in which an exclusive property or privilege is claimed are defined as follows:

1. A reverse brake actuator in combination with a transmission for retarding rotation of an input shaft during shift maneuver from neutral to reverse comprising:

a forward shift control rod;

forward synchronizer clutch means operatively connected with said forward shift control rod for synchronizing two forward ratios;

reverse shift control means for selectively establishing a reverse drive including a stationary rod; and detent means disposed between the forward shift control rod and the reverse shift control means for imposing a reaction force at a first level on the forward shift control rod when the reverse shift control means is actuated for partially actuating said forward synchronizer means during a neutral to reverse shift maneuver and at a second level during manipulation of the forward shift control rod for selection of one of the forward ratios, said detent means comprising a first detent member abutting the forward control rod, a second detent member abutting the stationary rod, a first spring means for urging the two detent members apart and a second spring means for engaging the two detent members only after a predetermined amount of compression of the first spring means.

2. A reverse brake actuator in combination with a transmission for retarding rotation of an input shaft during shift maneuver from neutral to reverse comprising:

forward shift control means including a shift control rod and fork means;

forward synchronizer clutch means engaged by said fork means and responsive to movement of said shift control rod to enforce synchronization of an input shaft with an output shaft;

reverse shift control means; and resilient force transmitting means disposed between the control rod of the forward shift control means and the reverse shift control means for imposing a first reaction force on the forward shift control means when the reverse shift control means is actuated for partially actuating said forward synchronizer means during a neutral to reverse shift maneuver and a second reaction force on the forward shift control means during a forward shift sequence comprised of a first spring continuously operable to effect both reaction forces and a second spring operable only to effect the first reaction force.

* * * * *